United States Patent [19]

Behn et al.

[11] Patent Number: 4,656,557

[45] Date of Patent: Apr. 7, 1987

[54] ELECTRICAL LAYER CAPACITOR AND METHOD FOR THE MANUFACTURE THEREOF

[75] Inventors: Reinhard Behn, Munich; Ferdinand Utner, Regensburg, both of Fed. Rep. of Germany

[73] Assignee: Siemens Aktiengesellschaft, Berlin and Munich, Fed. Rep. of Germany

[21] Appl. No.: 804,397

[22] Filed: Dec. 4, 1985

[51] Int. Cl.[4] .......................... H01G 1/14; H01G 4/08
[52] U.S. Cl. ..................................... 361/309; 361/323
[58] Field of Search .............. 361/308, 309, 310, 323, 361/328; 29/25.42

[56] References Cited

U.S. PATENT DOCUMENTS

| | | | |
|---|---|---|---|
| 1,128,058 | 2/1915 | Schoop | 361/309 |
| 3,256,472 | 6/1966 | Centurioni | 317/260 |
| 3,710,211 | 1/1973 | Behn et al. | 361/309 |
| 3,855,507 | 12/1974 | Hoyler | 317/258 |
| 4,376,329 | 3/1983 | Behn et al. | 361/309 X |
| 4,504,884 | 3/1985 | Vetter | 361/323 |

FOREIGN PATENT DOCUMENTS

| | | |
|---|---|---|
| 0011033 | 5/1980 | European Pat. Off. |
| 0097946 | 5/1984 | European Pat. Off. |
| 2416566 | 5/1976 | Fed. Rep. of Germany |
| 2726324 | 12/1978 | Fed. Rep. of Germany |
| 1229790 | 9/1960 | France |

Primary Examiner—Donald A. Griffin

[57] ABSTRACT

An electrical layer capacitor is formed of a stack of individual capacitors, each of which is formed of a plastic carrier layer, of a metal coating as an electrode applied thereto, of a plastic film as a dielectric generated thereon by glow polymerization, and a further metal coating applied as a cooperating electrode. The metal coatings of a same polarization are conducted to same lateral faces of the stack, and the individual capacitors are limited along a longitudinal direction of the stack by a straight cut at one side and by a wavy cut at the other side.

13 Claims, 6 Drawing Figures

ELECTRICAL LAYER CAPACITOR AND METHOD FOR THE MANUFACTURE THEREOF

BACKGROUND OF THE INVENTION

The invention relates to an electrical layer capacitor which is composed of a solidified stack of synthetic layers and metal coatings alternating with one another. The metal coatings are applied in regenerably thin manner to the synthetic layers. The stack has metal layers at opposite lateral faces which electrically connect the metal coatings of a same polarization to one another and in turn can serve for connecting the electrical capacitor to external power supply elements.

Electrical layer capacitors of this type and methods for the manufacture thereof are adequately disclosed in the corresponding technical literature.

Thus, German Pat. No. 492 621, incorporated herein by reference, discloses layer capacitors which have arisen by superimposed stacking of dielectric layers provided with metal coatings as electrodes, and by parting the stack in a longitudinal direction and at right angles thereto. Another form of layer capacitor has arisen by folding correspondingly metalized tapes. Finally, electrical layer capacitors of this type have arisen by winding tapes having a corresponding arrangement of the metal coatings onto a drum, and by dividing this winding at right angles to the longitudinal axis of the drum and then in a radial direction. The insulation both at the lateral faces, at which coatings of the same polarization are connected to one another by means of additional metal layers, as well as at the parting surface, at which all metal coatings are present, occurs by means of an appropriate selection of metal-free strips which are generated in the metallization of the tapes to be stacked or wound.

Given the electrical layer capacitor disclosed by German Pat. No. 975 263, incorporated herein by reference, the insulation surfaces between the different coatings at the parting surface are achieved, among other things, in that an adequately high voltage is applied to the finished capacitor so that the coatings burn off.

German Pat. No. 1 764 540, incorporated herein by reference, discloses a method for the manufacture of electrical layer capacitors which has proven itself in practice through wide use for many years and is comprised therein that metallized tapes corresponding to the width of the desired capacitor are wound onto a large diameter wheel. A mother capacitor ring thus results after a number of windings have been completed corresponding to the capacitance of the desired capacitor. A parting ply is then wound into at least one winding, and the next mother capacitor is then wound thereon. The next parting ply is then added and so forth until an initial capacitor composed of a plurality of mother capacitor rings has arisen. While still on the wheel, this initial capacitor is provided with metal layers at both end faces by means of the known schoopage method wherein small drops of molten metal are sprayed onto the surface to be metallized. They are sprayed, for example, by means of compressed air (see for example, U.S. Pat. Nos. 1,128,058 or 3,256,472, both incorporated herein by reference). After appropriate consolidation steps, the initial capacitor is divided into the individual mother capacitor rings. Obtained from these mother capacitor rings by cutting is a capacitor which may still have to be provided with power leads, be shock regenerated for curing defects, and finally is finished as an electrical layer capacitor.

The product of this method is described in detail in the periodical "Radio Mentor", 1972, No. 1, pp. 022 and 023, incorporated herein by reference.

European Pat. No. Al-0 011 033, incorporated herein by reference, and having a priority of October, 1978 also discloses a manufacturing method for such an electrical layer capacitor in detail. It is also disclosed therein that the edges of the tapes need not be cut straight. Rather, corresponding configurations can be selected as was already similarly presented in German Pat. No. 24 16 566, incorporated herein by reference.

This edge formation serves the purpose of improving the electrical and mechanical connection of the metal layers to be applied to the lateral faces by the schoopage method, namely their connection to the metal coatings on the dielectric films. The simplest way of effecting this electrical connection is achieved in that two metallized tapes which are respectively cut straight at both sides are wound offset relative to one another by a certain amount, so that a free space into which the metal of the contacting metal layer can penetrate respectively remains above the metallization extending up to the edge.

In the manufacture of layer capacitors according to the above-described wheel winding method, this method is applicable because the exact guidance of the layers, which is absolutely necessary in this method, is thereby guaranteed.

German AS No. 22 27 751 (corresponding to U.S. Pat. No. 3,855,507, incorporated herein by reference), likewise discloses a layer capacitor wherein tapes provided with metal coatings at both sides are wound offset relative to one another on a large diameter wheel, whereby the opposite film coatings for a dielectrically effective plastic layer result from one tape each.

In a capacitor whose dielectric is generated by glow polymerization of the monomer of a plastic from the vapor phase, for which purpose a metal coating is first vapor-deposited onto a plastic carrier film, the dielectric is generated thereon and a further metal coating is in turn applied thereto as a cooperating electrode (see German Pat. No. 23 02 174 and German Pat. No. 29 00 772, both incorporated herein by reference). Here, a merely lateral offset of layers cut straight does not guarantee an adequate contacting of the respective coatings of the same polarity.

SUMMARY OF THE INVENTION

An object of the present invention is to specify an electrical layer capacitor with plastic dielectric manufactured by glow polymerization wherein a reliable contacting of all coatings is guaranteed and a simplified manufacture thereof is possible.

For achieving this objective, the electrical layer capacitor of the invention is manufactured as follows.

(a) A stack is formed of a plurality of individual capacitors, each of which is composed of a plastic carrier film. A regenerably thin metal coating is applied on the carrier film as a first electrode, and which leaves an uncovered edge region on the carrier film. A plastic layer is generated thereon by glow polymerization as a dielectric while leaving an uncovered edge region on the metal coating. A regenerably thin metal coating is applied thereto as a cooperating electrode, and leaving an uncovered edge region on the dielectric.

(b) Metal coatings of the same polarization are conducted to the same lateral faces of the stack.

(c) The individual capacitors are limited on one side in a longitudinal direction of the stack by a straight cut and are limited by a wavy cut at the other side. The individual capacitors are alternately situated in the stack so that the straight cut is at the same side as an adjacent wavy cut of an adjacent capacitor.

Both a faultless guidance, and thus an exact stacking of the individual capacitors as well as a reliable contacting of the metal coatings thereof, are guaranteed by the invention, since a slight cavity arises above every metal coating to be contacted at its edge side. A wave peak alternating with a wave valley results and the area within a wave valley suffices for the contacting.

The individual capacitors situated in alternating fashion in the stack are preferably offset relative to one another by an amount which is dimensioned such that the wave peaks of the wavy cut project from the lateral faces of the stack.

The region to be contacted is further enlarged by means of this lateral offset.

It is advantageous for further improving the contact reliability when the wave peaks of an individual capacitor are offset relative to the wave peaks of the next individual capacitor, and the wave peaks of the other individual capacitor are offset relative to the wave peaks of the next individual capacitor, and are offset relative to one another in a longitudinal direction of the stack.

The wavy cuts preferably correspond to a sine curve, whereby the frequency and/or the amplitude of the sine curves of the wavy cuts preferably differ from individual capacitor to individual capacitor.

An embodiment which is particularly favorable for the contacting is established when the uncovered edge regions of the plastic carrier film is respectively situated at the edge having the straight cuts and wherein the first metal coating together with the glow polymerization layer extend up to the opposite edge having the wavy cut (FIG. 3).

In another embodiment, the uncovered edge regions of the metal coatings on the plastic carrier films of all individual capacitors of the stack are always contained at the same lateral face, whereby the metal coatings always extend up to the other lateral face (FIG. 5).

Particularly given is an embodiment wherein the films to be wound are not offset relative to one another. It is advantageous when unmetallized spacer films of plastic are contained in the stack between two respective individual capacitors, the width of these spacer films being smaller than the width of the plastic carrier films of the individual capacitors.

With the method of the invention for manufacturing an electrical layer capacitor, at least two tapes having a corresponding arrangement of the metal coatings and of the plastic layers are produced and wound on a large diameter wheel. Metal layers are first vapor-deposited onto two tapes serving as carrier films. The plastic layers are then generated by glow polymerization of plastic from the vapor phase. Subsequently, the metal coatings are likewise vapor-deposited, and wherein the respectively required free edges are also generated. The tapes are then provided with the straight cut and with the wavy cut. An initial capacitor is produced by winding these tapes onto the large diameter wheel. This initial capacitor is formed of a plurality of mother capacitor rings separated from one another by a parting ply. In this winding operation, the tapes are guided at the side respectively provided with the straight cut. Then, the two end faces of the initial capacitor are provided with metal layers by means of the metal spraying method (schoopage). The initial capacitor is then divided into the mother capacitors from which the individual stacks are separated, particularly by sawing. These individual stacks are then provided, as needed, with power leads, and are shock regenerated and finished as electrical capacitors.

The separation of the individual stacks from the mother capacitor rings by sawing thereby preferably occurs in the fashion disclosed by German Pat. No. 1 764 548, incorporated herein by reference, whereby, given employment of a stretched tape as a plastic carrier film and aluminum as metal for the coatings, insulation zones arise due to the specific management of the sawing process. These insulation zones are longer by a multiple of the direct distance between the coatings from dielectric to dielectric in accordance with its thickness because the insulation zones extend onto the surface of the metal coatings.

Polyethylene terephthalate, polycarbonate, polyimide and similar materials are particularly suitable as material for the carrier films. The carrier films preferably have a thickness of 1.5 to 5 $\mu$m.

Aluminum preferably serves as the coating metal.

Particularly suitable as the plastic to be manufactured from the vapor phase by glow polymerization are cyclical hydrocarbons without double bonding or non-cyclical hydrocarbons with a double bond such as, for example, one or more of the substances pentene, hexene, heptene, octene, cyclopenentane, cyclohexane, cycloheptane or cycloctane, as well as cyclofluorubutane, as specified in the aforementioned German Pat. No. 23 02 174.

The thickness of the plastic layers acting as dielectric preferably amounts to 0.1 to 1 $\mu$m.

The thickness of the metal coatings should be dimensioned such that the capacitors are regenerable, i.e. the thickness lies in the range from 0.015 to 0.05 $\mu$m.

Serving first and foremost as metal layers for contacting the coatings of the same polarity at opposite end sides of the stack is aluminum onto which a second layer of solderable metal, namely an aluminum white metal alloy, is usually applied, as disclosed in the aforementioned U.S. Pat. No. 3,256,472.

Insofar as the plastic of the carrier film and/or of the dielectric is not itself suitable for guaranteeing or for promoting the regeneration process given dielectric breakdowns, a layer of a plastic which guarantees the regeneration process can be situated insofar as possible in the field-free space, as already presented in the aforementioned German AS No. 22 27 751.

DESCRIPTION OF THE PREFERRED EMBODIMENTS

Figure 1:
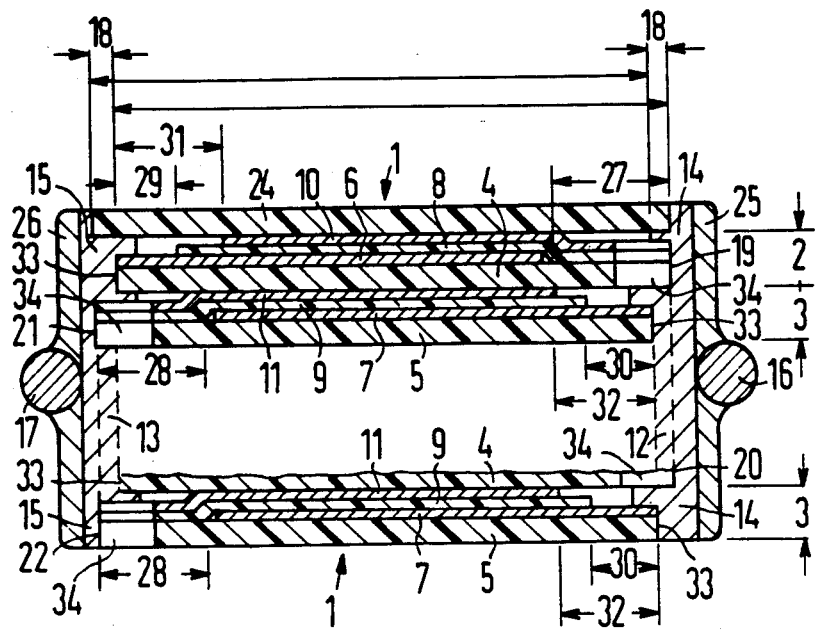
FIG. 1 shows a capacitor in section.

The capacitor of FIG. 1 is formed of stack 1 constructed of a plurality of individual capacitors 2 and 3 (only three individual capacitors are shown in FIG. 1 for reasons of clarity). Every individual capacitor 2 or 3 has a plastic carrier layer 4 or 5. A first metal coating 6 which leaves an uncovered edge region 27 at the right side in FIG. 1 is applied to the plastic carrier layer 4. A metal coating 7 which leaves an uncovered edge region 28 at the left side in the figure is applied to the plastic carrier layer film 5. The metal coatings 6 and 7 serve as a first electrode of the individual capacitors 2 and 3 and are preferably formed of aluminum.

Glow polymerization layers 8 or 9 which respectively leave an uncovered edge region 29 and 30 on the metal coating 6 or 7 are applied above the metal coatings 6 and 7.

Respective metal coatings 10 and 11 are applied as a cooperating electrode to the glow polymerization layers 8 and 9, these metal coatings again resulting in free edge regions 31 and 32. These uncovered edge regions are respectively present at the opposite side relative to the uncovered edge regions 27 and 28 where the metal coatings 6 and 7 terminate.

Metal contact layers 14 and 15 are applied, preferably by the schoopage method, to the lateral faces 12 and 13 of the stack 1, and external power lead elements 16 and 17 are soldered to these metal layers 14 and 15, particularly upon employment of further, solderable metal layers 25 and 26 formed, in particular, of white metal alloy.

The individual capacitors 2 and 3 are laterally offset relative to one another by an amount 18, so that the metal layers 14 and 15 can penetrate into the lateral faces 12 and 13 of the stack 1.

It is also shown in FIG. 1 that the stack 1 can be terminated in insulating fashion toward the outside by at least one cover ply 24. It is thus terminated at at least its upper side (if need be, at the underside as well).

Figure 2:
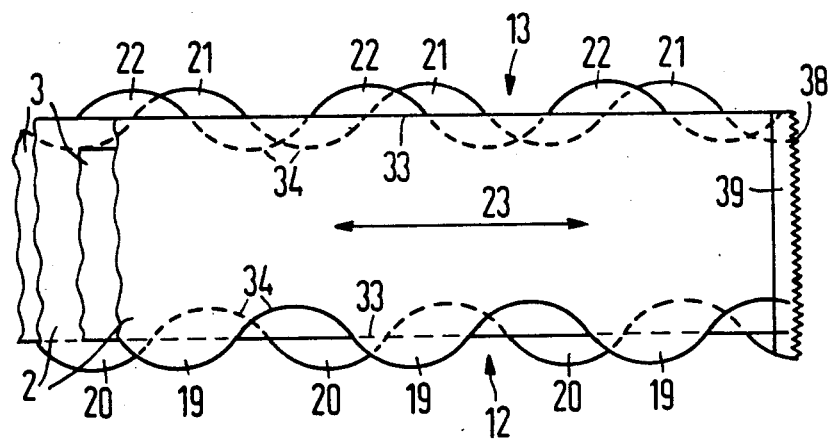
FIG. 2 illustrates individual capacitors of FIG. 1 stacked on top of one another, shown schematically and greatly enlarged.

In accordance with FIG. 2, two individual capacitors 2 are shown alternating with two individual capacitors 3. In FIG. 2, the individual capacitors 2 respectively comprise a straight cut 33 at their upper edge, whereas a wavy cut 34 is present at the lower edge.

In the individual capacitors 3, the straight cut 33 is located at the lower edge, whereas the wavy cut 34 is respectively present at the upper edge. At the lower edge of FIG. 2, the wave peaks 19 and 20 of the individual capacitors 20 project beyond the straight cut 33 of the individual capacitors 3, whereas the wave peaks 21 and 22 of the individual capacitors 3 project beyond the straight cut 33 at the upper edge of FIG. 2.

The reference numerals 19, 20, 21, 22, 33, 34 are also entered in FIG. 1 in order to show how the straight cut 33 and the wavy cut 34 lead to the wave peaks 19 through 22 which are arranged in appropriate fashion in the capacitor.

It is further shown in FIG. 2 that the individual wave peaks of the individual capacitors 2 or 3 are offset relative to one another in the longitudinal direction 23 of the stack 1.

The zig-zag line 38 in FIG. 2 also indicates that the stack 1 was separated at this location from the above-described mother capacitor by sawing, so that an insulation zone 39 arises there upon consideration of the conditions indicated above.

As a result both of the lateral offset by the distance 18 as well as by the offset of the wave peaks in longitudinal direction 23, the wave peaks project beyond the actual edge of the capacitor at the lateral faces 12 and 13, and can be electrically and mechanically well-grasped there by the metal layers 14 and 15 in this way.

The wavy cut can preferably correspond to a sine curve, whereby the frequency and/or the amplitude of the sine curves of the wavy cuts 34 also additionally differ from individual capacitor 2 or 3 to individual capacitor 2 or 3. This is set forth in greater detail in the aforementioned German Pat. No. 24 16 566.

Figure 3:
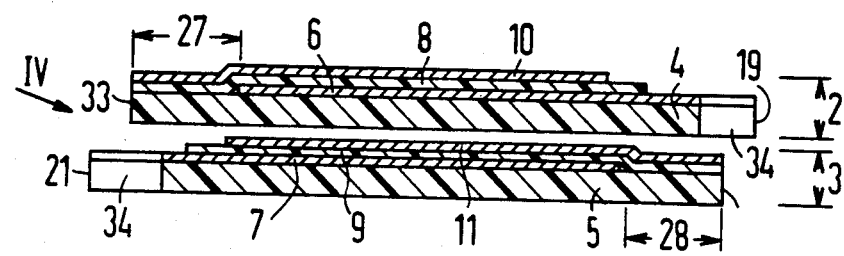
FIG. 3 illustrates a special development for the arrangement of the individual capacitors.

FIG. 3 shows a preferred embodiment of the invention wherein the free edges 27 and 28 of the metal coatings 6 and 7 on the plastic carrier layers 4 and 5 are respectively situated at the edge having the straight cuts 33, and the metal coatings 10 or 11 together with the glow polymerization layers 8 or 9 extend up to the opposite edge having the wavy cuts 34.

Figure 4:
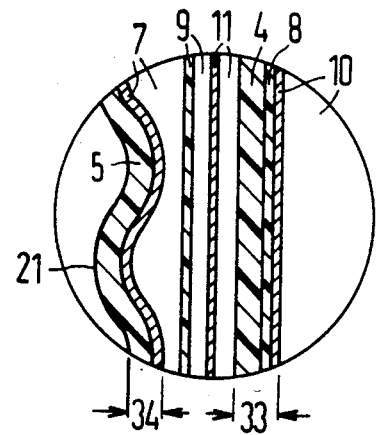
FIG. 4 is a view in accordance with the arrow IV in FIG. 3.

This embodiment guarantees a particularly good contacting of the identical polarization coatings 7 and 10 at the one side and the identical polarization coatings 6 and 11 at the other side of the capacitor because the wave valleys between the wave peaks 21 or 19 keep the space free above the coatings to be contacted. FIG. 4 shows a magnified portion in accordance with the arrow IV in FIG. 3, whereby the individual reference numerals correspond to the reference numerals already explained.

Figure 5:
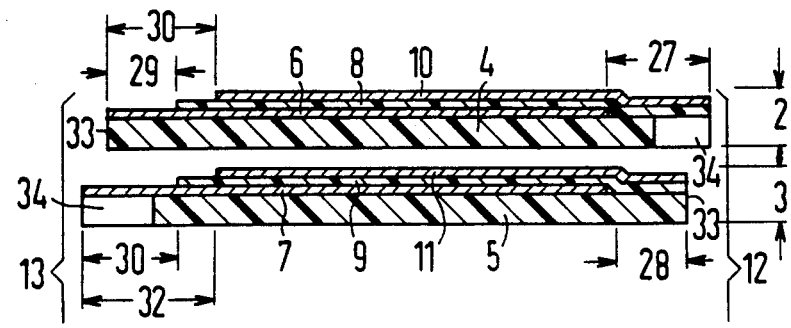
FIG. 5 is another arrangement of the individual capacitors.

The arrangement of the individual capacitors 2 and 3 in accordance with FIG. 5 shows that the uncovered edge regions 27 and 28 of the metal coatings 6 and 7 on the plastic carrier layers 4 and 5 of all individual capacitors 2 and 3 of the stack 1 are always contained at the same lateral face 12, and the metal coatings 6 and 7 thus always extend up to the other lateral face 13. A good contacting of the identically named metal coatings 10 and 11 at the lateral face 12 as well as of the metal coatings 6 and 7 at the lateral face 13 is also thereby guaranteed.

Figure 6:
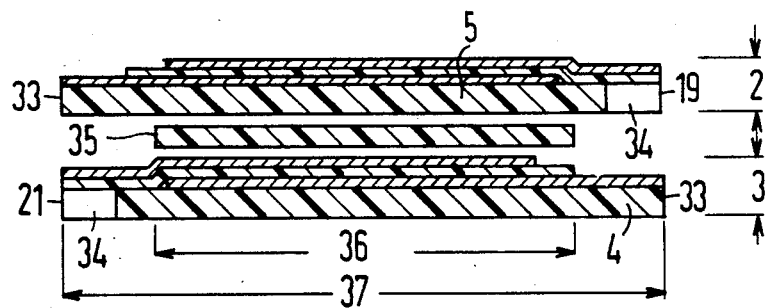
FIG. 6 is an arrangement of individual capacitors with use of a spacer layer.

FIG. 6 shows an arrangement of the individual capacitors 2 and 3 which need not be offset relative to one another because a spacer film 35 is provided in the field-free space, the width 36 thereof being smaller than the width 37 of the plastic carrier layers 4 and 5. An adequate free space for the penetration of the metal layers 14 or 15 (see FIG. 1) likewise arises in this way above the identical polarity coatings to be connected to one another.

While various minor changes and modifications might be proposed by those skilled in the art, it will be understood that we wish to include within the claims of the patent warranted hereon all such changes and modifications as reasonably come within our contribution to the art.

We claim as our invention:

1. An electrical layer capacitor, comprising:
a stack having opposite lateral faces and formed of a plurality of first and second individual capacitors, each of which is formed of a plastic carrier layer, a regenerably thin first metal coating as a first electrode applied on the carrier layer so as to leave a first metal free edge region at one side of the carrier layer, a plastic glow polymerization layer as a dielectric on the first metal coating and which leaves an uncovered edge region on the first metal coating near an opposite face of the capacitor relative to the first metal free edge region, and a regenerably thin second metal coating as a second electrode on the glow polymerization layer and which leaves a second metal free uncovered edge region on the flow polymerization layer also near said face of the capacitor relative to the first metal free edge region;

metal coatings of the same polarization being electrically connected at same lateral faces of said stack; and each of the individual capacitors having at one side a straight cut and at an opposite side a wavy cut, and wherein the first and second individual capacitors are adjacent one another in the stack and are aligned such that a straight cut of the one capacitor with the metal layer thereat to be contacted is adjacent a wavy cut of the other capacitor with the metal layer thereat to be contacted and vice versa.

2. An electrical layer capacitor according to claim 1 wherein for four consecutive individual capacitors, wave peaks of each first and third and each second and fourth capacitor are at the same lateral face of the stack.

3. An electrical layer capacitor according to claim 2 wherein wave peaks of the wavy cuts of the first and third and second and fourth capacitors are offset relative to one another where they project at respective lateral faces of the stack.

4. An electrical layer capacitor according to claim 1 wherein for four consecutive individual capacitors, wave peaks of the wave cut of each first and third individual capacitor are offset relative to one another and wherein wave peaks of each second and fourth individual capacitor are offset relative to one another.

5. An electrical layer capacitor according to claim 1 wherein said wavy cuts correspond to a sine curve.

6. An electrical layer capacitor according to claim 5 wherein a frequency of said sine curves of said wavy cuts are different from individual capacitor to individual capacitor.

7. An electrical layer capacitor according to claim 5 wherein an amplitude of said sine curves of said wavy cuts are different from individual capacitor to individual capacitor.

8. An electrical layer capacitor according to claim 1 wherein said uncovered edge regions of said first metal coatings are located at the side having said straight cuts and said second metal coatings together with said glow polymerization layers extending to the opposite side having said wavy cuts.

9. An electrical layer capacitor according to claim 1 wherein said uncovered edge regions of said first metal coatings are located at the side having said wavy cuts and said second metal coatings together with said glow polymerization layers extend to the opposite side having said straight cuts.

10. An electrical layer capacitor according to claim 1 wherein said uncovered edge regions of said first metal coatings on said plastic carrier layers of all individual capacitors of said stack are always positioned at a same lateral face, and said first metal coatings always extending up to the other lateral face.

11. An electrical layer capacitor according to claim 1 wherein an unmetallized spacer layer of plastic is positioned in said stack between individual adjacent capacitors, a width of said spacer layer being smaller than a width of said plastic carrier layers of said individual capacitors.

12. A method for manufacture of an electrical layer capacitor, comprising the steps of:

providing at least first and second carrier layers as first and second tapes;

vapor depositing a first metal layer on each of the carrier layers and wherein an uncovered edge region is left on the carrier layers at only one side thereof;

generating a plastic layer by glow polymerization of plastic from the vapor phase on each of the first metal layers and such that an uncovered edge region results at only one side of the first metal layer;

depositing a second metal layer on each of the glow polymerization layers and providing an uncovered edge region on each glow polymerization layer at only one side thereof;

providing each of said first and second tapes with a straight cut to one side of a longitudinal extent thereof and with a wavy cut at the opposite side thereof;

manufacturing an initial capacitor from the at least first and second tapes by winding them onto a large diameter wheel such that the wavy cut of the first tape lies adjacent the straight cut of the adjacent second tape, said initial capacitor thus having at least two mother capacitor rings;

during said winding operation, guiding said tapes at the side provided with the straight cut;

providing opposite end faces of the initial capacitor with metal layers by metal spraying such that adjacent metal layers at the straight cut and at the wavy cut are contacted at the respective end faces;

dividing said initial capacitor into mother capacitor rings from which individual stacks are separated; and said individual stacks being subjected to final processing into finished electrical capacitors.

13. An electrical layer capacitor, comprising:

a stack formed of at least first and second individual capacitors one above the other;

each of the individual capacitors comprising
  a carrier layer,
  a first metal coating on the carrier layer leaving an uncovered region at only one side edge of the carrier layer,
  a glow polymerization layer on the first metal coating and leaving an uncovered region on the first metal coating only at an opposite side edge of the carrier layer,
  a second metal coating on the glow polymerization layer and leaving an uncovered region on the glow polymerization layer at only said opposite side edge of the carrier layer,
  the carrier layer, the first and second metal coatings, and the dielectric layer as an assembly having at said one side edge of the carrier layer a wavy cut and at the opposite side of the carrier layer a straight cut, the first and second capacitors being adjacent one another and arranged such that the wavy cut of the first capacitor is adjacent the straight cut of the adjacent second capacitor; and metal contact layers at lateral sides of the capacitor stack which fill in troughs of the wavy cut so as to contact both a straight portion of the straight cut edge and a protruding portion of a wavy edge of the wavy cut adjacent to the straight edge.

* * * * *